United States Patent [19]

Sarnoff et al.

[11] Patent Number: 4,941,401
[45] Date of Patent: Jul. 17, 1990

[54] MICROWAVEABLE FISH POACHER

[75] Inventors: Norton Sarnoff, Northbrook; Carl R. Fletcher, Arlington Heights, both of Ill.

[73] Assignee: Ensar Corporation, Wheeling, Ill.

[21] Appl. No.: 462,612

[22] Filed: Jan. 9, 1990

[51] Int. Cl.⁵ .......................... A47J 27/00; H05B 6/80
[52] U.S. Cl. .......................................... 99/446; 99/413;
99/418; 99/450; 99/DIG. 14; 126/369;
219/10.55 E; 220/409; 220/428
[58] Field of Search ................. 99/345, 403, 408, 413,
99/415, 418, 426, 444, 446, 449, 450, 451, DIG.
14; 426/243; 219/10.55 E, 10.55 F, DIG. 44;
220/409, 428; 126/369; 229/3.5 R

[56] References Cited

U.S. PATENT DOCUMENTS

| | | | |
|---|---|---|---|
| 475,435 | 5/1892 | Burnap | 126/369 |
| 1,311,990 | 8/1919 | Moller | 220/428 |
| 1,330,868 | 2/1920 | Harrison | 220/428 |
| 1,862,420 | 6/1932 | O'Brien | 99/446 |
| 2,083,147 | 6/1937 | Clarkson | 99/345 |
| 2,588,614 | 3/1952 | Capra et al. | 99/450 |
| 2,875,683 | 3/1959 | Burns | 99/444 |
| 3,489,075 | 1/1970 | O'Reilly | 99/450 |
| 3,640,209 | 2/1972 | Wilson | 99/446 |
| 3,994,212 | 11/1976 | Wong | 99/444 |
| 4,106,486 | 8/1978 | Lee | 99/450 |
| 4,186,217 | 1/1980 | Tchack | 99/445 |
| 4,291,616 | 9/1981 | Taylor | 99/446 |
| 4,401,017 | 8/1983 | Feld | 126/369 |
| 4,653,461 | 3/1987 | Eke | 99/446 |
| 4,663,506 | 5/1987 | Bowen et al. | 99/DIG. 14 |
| 4,705,927 | 11/1987 | Levendusky et al. | 219/10.55 E |
| 4,827,838 | 5/1989 | Bishop | 99/349 |
| 4,870,233 | 9/1989 | McDonald et al. | 219/10.55 E |
| 4,871,892 | 10/1989 | Samford | 99/DIG. 14 |
| 4,880,951 | 11/1989 | Levinson | 220/409 |

FOREIGN PATENT DOCUMENTS 3714323  11/1988  Fed. Rep. of Germany ... 219/10.55 E

Primary Examiner—Timothy F. Simone
Attorney, Agent, or Firm—Dressler, Goldsmith, Shore, Sutker & Milnamow, Ltd.

[57] ABSTRACT

An elongated microwaveable fish poacher comprising a non-metallic, plastic base, rack and cover, and defining a fish poacher interior. The assembled parts present the appearance of a fish, with handles serving as a tail and fins, and cooperate to minimize undesired exchange of air from exterior of the assembled parts within which fish is adapted to be cooked in a microwave oven.

6 Claims, 4 Drawing Sheets

MICROWAVEABLE FISH POACHER

BACKGROUND OF THE INVENTION

Elaborate, very sizeable metallic fish poachers are currently available for commercial food service use. They are also available for domestic use, but their size and metallic construction makes them unsuitable for use in a microwave oven. Further, available metallic fish poachers tend to be very large, and are not convenient for the poaching of small fish or of small portions of larger fish. It would therefore be of advantage to provide a fish poacher for smaller fish and fish portions, and especially one for use in a microwave oven.

SUMMARY OF THE INVENTION

In accordance with the present invention, an improved fish poacher is provided. The fish poacher is usable in a microwave oven and is non-metallic. It is elongated and comprises a non-metallic, plastic base, rack and cover which together define a fish poacher interior. The base is dish-shaped and comprises a floor and an upstanding peripheral sidewall and a pair of handles. The rack comprises a perforated fish supporting base and a pair of handles. The cover comprises a cover portion for overlying the base and the rack and defines a depending lip confronting the upstanding peripheral sidewall, and a handle. Means on one of the rack base and floor for elevating said rack base above the floor is provided. One of the upstanding peripheral wall and depending lip define notch means at each end of the poacher, and the rack handles are disposed in and extend outwardly through the notch means.

The base handles and the rack handles extend outwardly. Thus, the base handles enable the base, rack and cover to be lifted together, as when it is desired to carry the fish poacher, with a fish and liquid therein, into or from a microwave oven. Also the rack handles enable the rack and cover to be removed together, as when it is desired to transfer the rack and cover with a poached fish on the rack, to a second or other base, in which drainage from the poached fish can collect. The cover handle, moreover, enables the cover to be removed from the base and rack.

In a preferred form, the elongated microwaveable fish poacher upstanding peripheral wall and depending lip define notches in which the rack handles are disposed and through which the rack handles extend outwardly. Preferably the fish poacher is greater in length than in width and the rack handles are at the lengthwise ends of the poacher, with one of the rack handles being covered in plan view by the cover portion and the other handle extending outwardly beyond one end of the cover portion also to present the impression of a fish tail. The base handles extend outwardly from the upper reaches of the sidewall generally intermediate the length of the fish poacher and outwardly of the width of the cover portion to present the appearance of fish fins.

In one form the elevating means comprises projections on the floor of the rack base and the perforated fish supporting base defines a series of elongated slots. Desirably the notch means is defined by the upstanding peripheral wall at opposite ends of the base, the rack handles extend forwardly and rearwardly through the notches, and the rack handles, when the cover is in place, are positioned to baffle air exchange between the interior and exterior of the fish poacher.

Further objects, features and advantages of the invention will become apparent from the following description and drawings.

BRIEF DESCRIPTION OF THE DRAWINGS

FIG. 7 is a fragmentary view of the poacher of FIG. 1 with the cover removed;

FIG. 8 is a view taken substantially along line 8—8 of FIG. 7;

FIG. 9 is a further fragmentary view of the poacher of FIG. 1 at the opposite side from FIG. 7, with the cover removed; and FIG. 10 is a view taken substantially along the line 10—10 of FIG. 9.

DESCRIPTION OF A PRESENTLY PREFERRED EMBODIMENT

Figure 1:
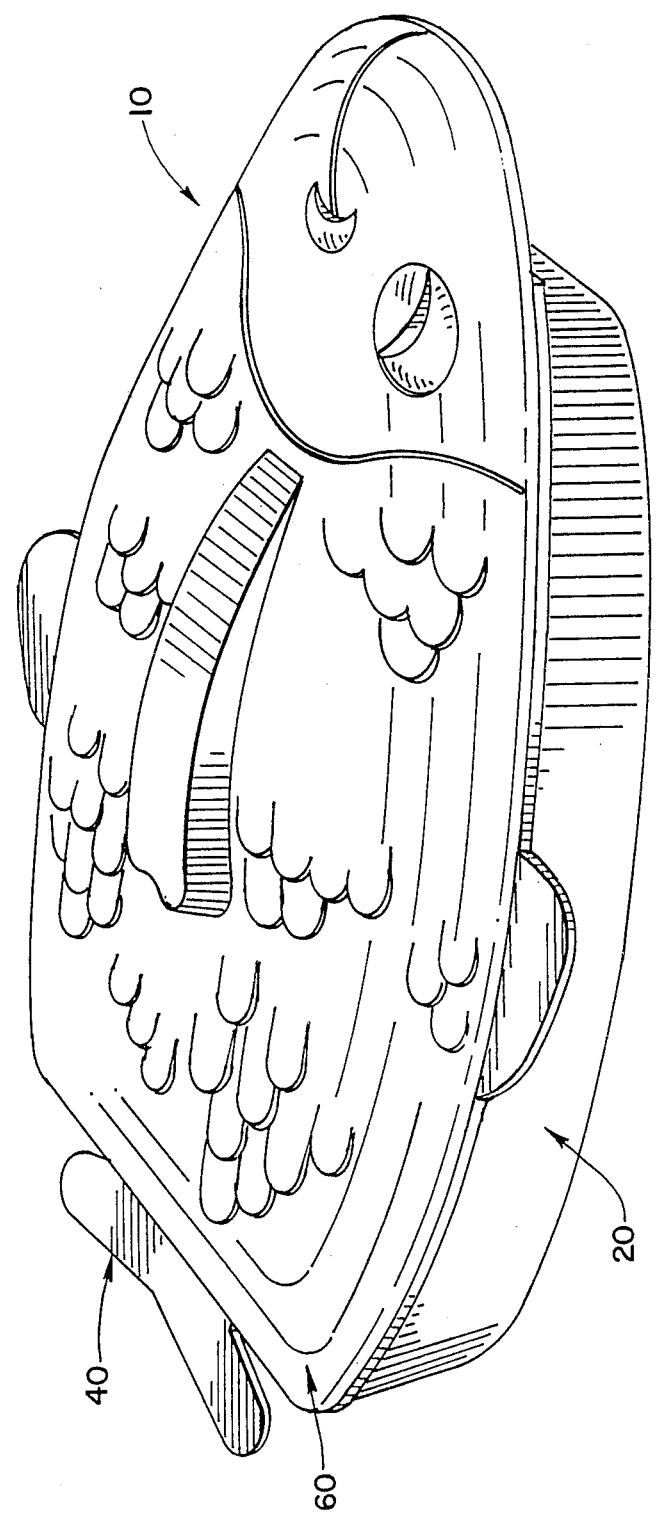
FIG. 1 is a top perspective view of a microwaveable fish poacher in accordance with the present invention.
Figure 2:
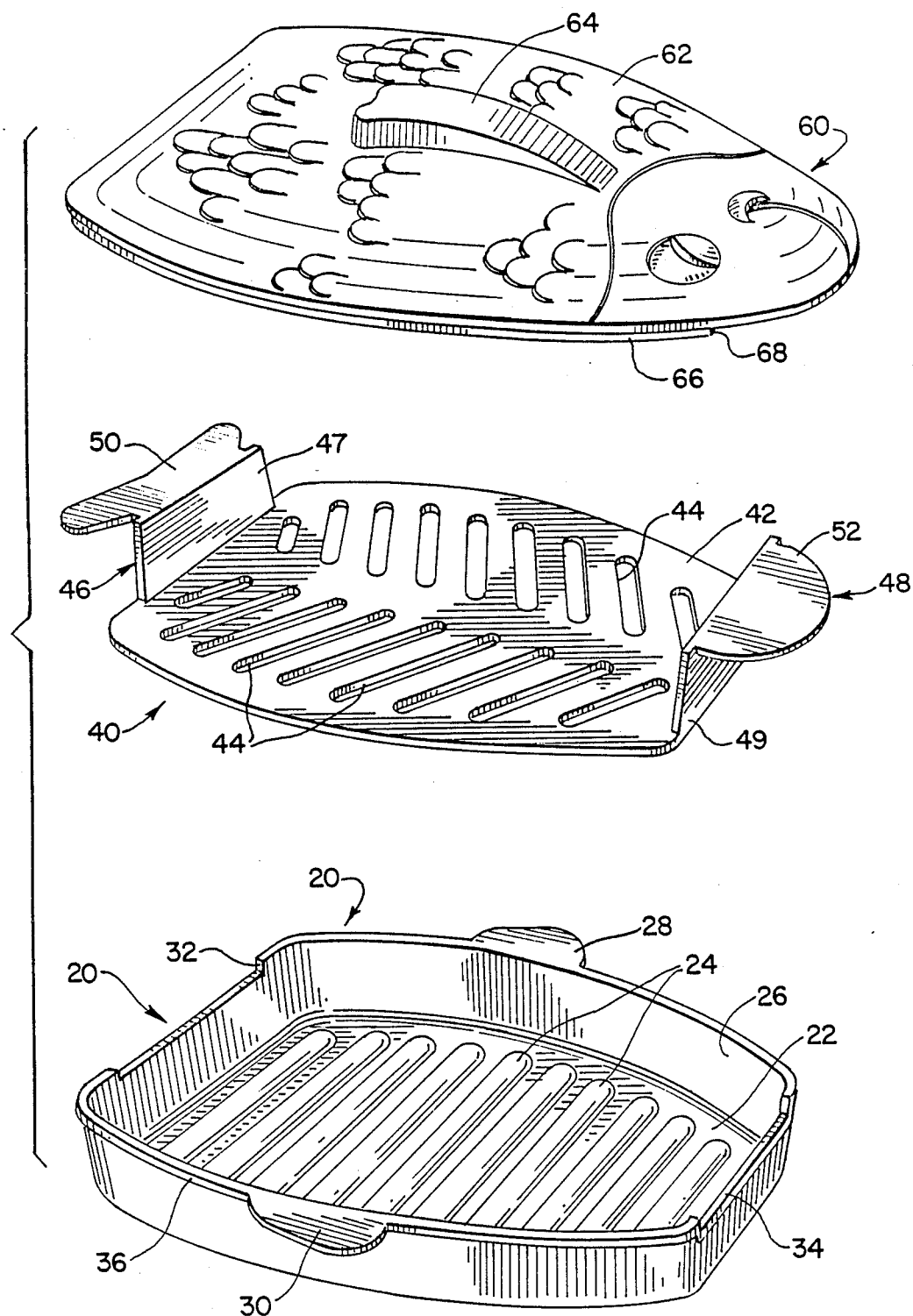
FIG. 2 is an exploded perspective view of the cover, fish support rack and base of the poacher of FIG. 1.
Figure 3:
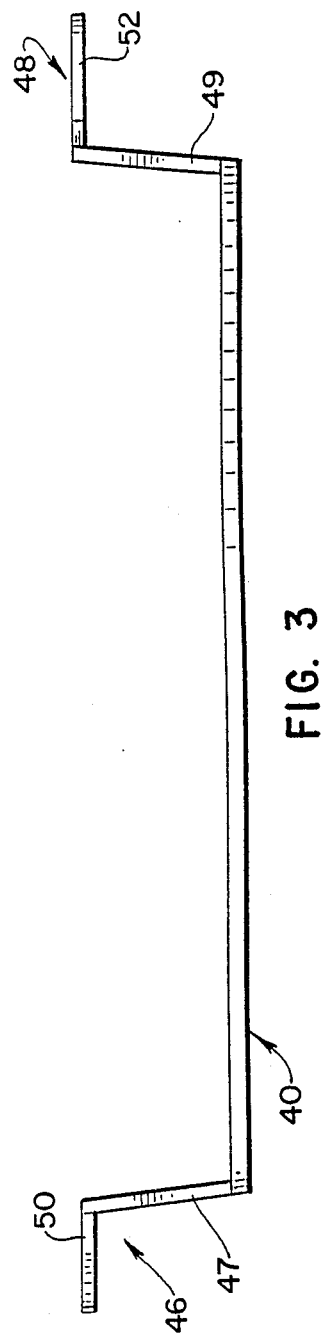
FIG. 3 is a side elevational view of the fish support rack of the poacher of FIG. 1.
Figure 5:
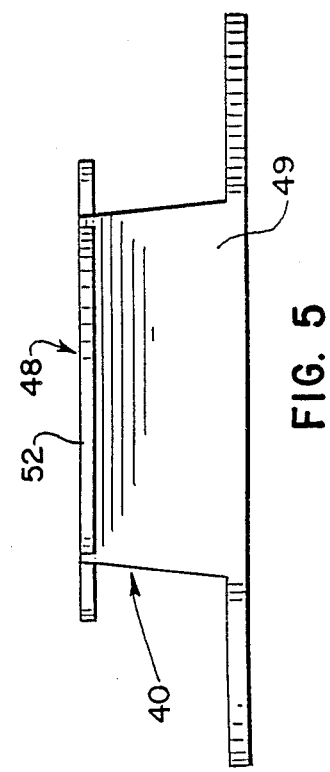
FIG. 5 is a right end elevational view of the fish support rack of the poacher of FIG. 1.
Figure 4:
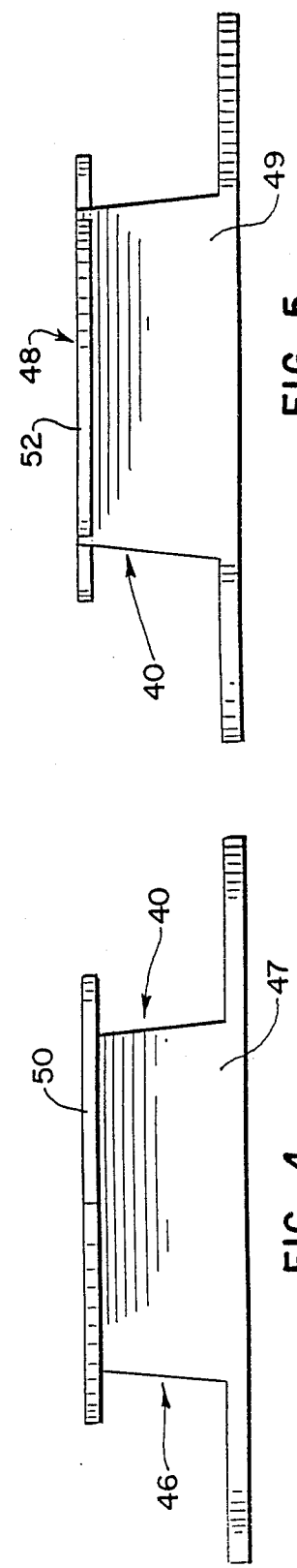
FIG. 4 is a left end elevational view of the fish support rack of the poacher of FIG. 1.
Figure 6:
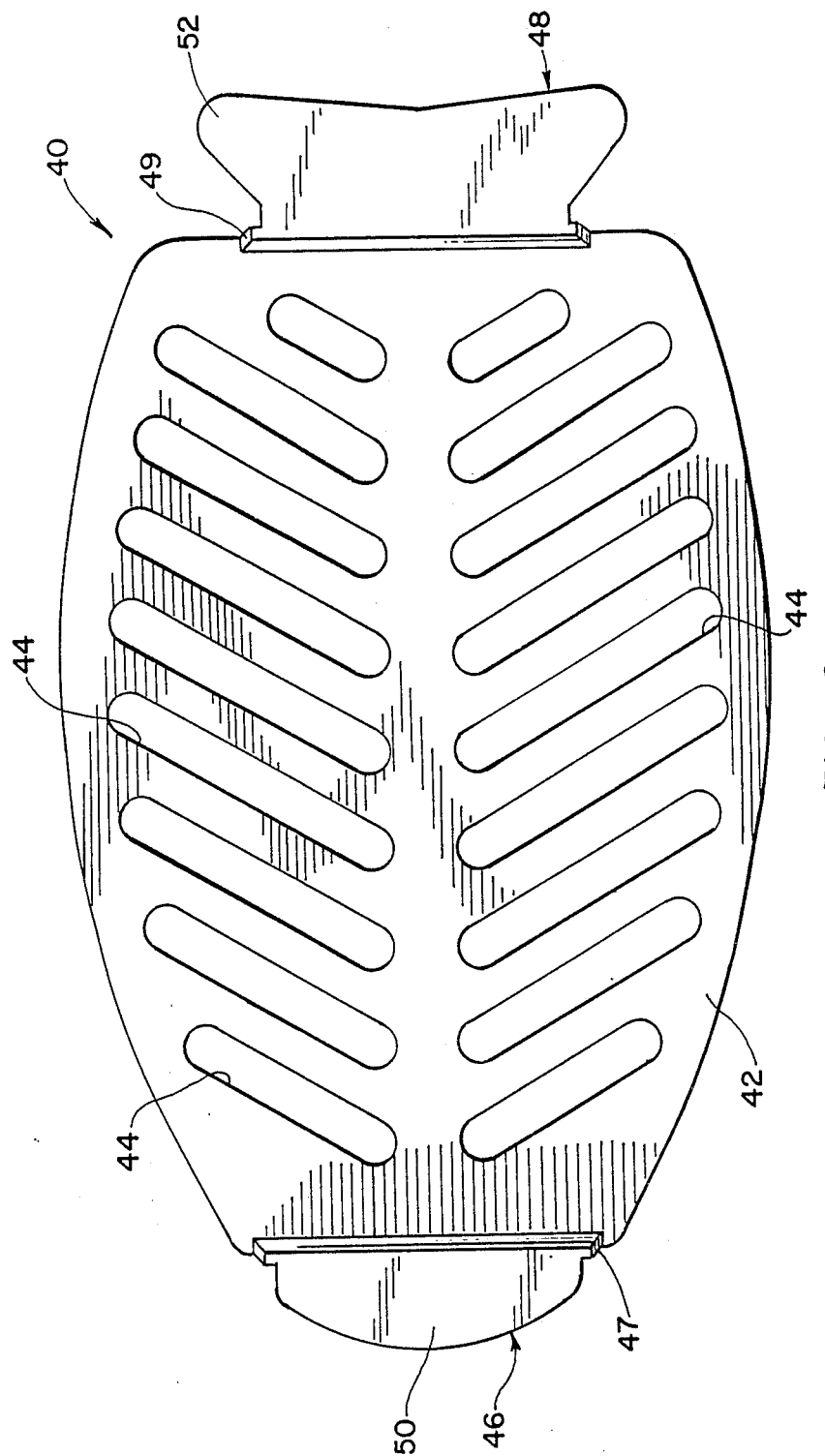
FIG. 6 is a plan view of the fish support rack of the poacher of FIG. 1.

Referring now to the drawings, a microwaveable fish poacher 10 is non-metallic and is molded of plastic material, such as a fiberglass-filled polypropylene, which is suitable for food contact and transparent to microwave energy, and which does not melt or degrade when heated by heat transfer from heated food contacting such material. Poacher 10 includes a base 20, a rack 40 and a cover 60. Poacher 10 is longer than it is wide.

Base 20 is dish-shaped and comprises a floor 22 which is provided with a series of molded ridges or projections 24 which extend upwardly from the base elevation of the floor. Ridges 24 terminate inwardly of an upstanding peripheral sidewall 26. Sidewall 26 is disposed at an angle of approximately 95 degrees to the floor 22.

The base 20 is provided with a pair of handles 28, 30 which extend outwardly from the upper reaches or edges of the sidewall 26 generally intermediate of the length of the poacher 10. In its preferred form handles 28, 30 are sculpted in plan view to give the impression of fish fins. Handles 28, 30 extend outwardly beyond the base, rack and cover to enable them to be lifted together by those handles so that the fish and any liquid in the fish poacher may be conveniently transported.

At each of the opposite longitudinal ends of the base 20, the upstanding sidewall 26 defines a notch, namely notches 32, 34. As will appear, notches 32, 34 are proportioned to accommodate portions of the rack 40.

In a preferred form, the base may be about 9.5 inches long, about 7 inches wide, with the handles 28, 30 projecting somewhat from each side, and about 1.75 inches deep. The ridges extend about 1/16 inch upwardly from the floor and the notches 32, 34 are about ⅛ inch in depth. The thickness of the sidewall and floor is about 0.07 inch. At the upper edge of the sidewall an outwardly projecting stabilizing and trim flange 36 is provided.

Rack 40 comprises a fish supporting base 42 which defines a plurality of openings, such as a series of elongated slots 44 which are arranged in a generally V- shaped array or herringbone array. A handle 46, 48 is provided at each longitudinal end of the base. Handles 46, 48 at the lengthwise ends of the rack include upstanding elements 47, 49 integral with the base 42 and outwardly extending gripping elements 50, 52. As will appear, gripping element 50 is desirably sculptured in plan view to give the impression of a fish tail. Gripping element 50 may be suitably shaped in plan view. Both gripping elements are proportioned, at their zones of connection to the upstanding elements, to be seated in and project outwardly (forwardly and rearwardly) through the notches 32, 34 in the base. Handles 46, 48 extend outwardly beyond the base 20 to enable the rack and cover to be lifted and carried together by those handles.

Cover 60 preferably comprises a central cover portion 62 which may be somewhat domed. Cover portion 62 overlies the rack 40 and base 20, preferably except for handles 28, 30 and 50 which, as may be seen from FIG. 1, give the appearance of a fish with a tail (handle 50) and fins (handles 28, 30). In plan view, the central cover portion preferably covers rack handle 48. Cover 60 also provides a sculpted handle 64 which enables the cover to be removed from the base and rack. The cover upper surface is preferably sculptured to create the appearance of a fish head and scales, especially with the fins and tail impressions given by the handle portions.

Cover 60 also provides a depending lip 66 which projects downwardly and is proportioned and positioned to closely fit along and inwardly of the upper edge of upstanding sidewall 26. As such, partial sealing of the cover and base is provided for thereat. The lip 66 is interrupted at the forward and rearward ends of the cover 60 to define cover lip notches 68 which coincide generally with notches 32, 34 through which handles 46, 48 may project.

As may be seen the cover 60 and base 20 are generally sealed throughout most of their periphery, except at the tail or back, and at the head end or front of the poacher 10. These limited openings through which the rack gripping elements 50, 52 project forwardly and rearwardly, allow steam generated in the poaching process to escape without building up pressure within the interior defined by the assembled base, cover and rack, but limit the exchange of cool external air with the interior of the poacher to keep the poached fish hot for an extended period of time.

Further, as may be seen, the upstanding elements 47, 49 of handles 46, 48 have lateral projecting portions which serve also as baffles to baffle and reduce the movement of air and air exchange between the exterior and interior of the fish poacher 10 during holding periods for the poached fish.

In use, the rack 40 is disposed in the base 20. The base 42 of the rack is disposed above the floor of the base by the ridges 24 to provide for areas in which cooking juices may collect below the fish which is supported on the rack base. The cover is positioned as shown in FIG. 1 and the assembled poacher 10 is then disposed in a microwave oven. After the cooking cycle is completed, the poacher may be used as a holding and serving container. It provides an attractive fish-like appearance until the fish is to be served, and also serves to minimize air exchange to keep the fish hot and moist.

It will be apparent to those skilled in the art that modifications may be made, and embodiments designed, without departing from the spirit and scope of the present invention. Thus, the invention is to be construed in the context of the appended claims.

What is claimed is:

1. An elongated microwaveable fish poacher comprising a non-metallic, plastic base, rack and cover, and defining a fish poacher interior, said base being dish-shaped and comprising a floor and an upstanding peripheral sidewall and a pair of handles which extend outwardly beyond said cover so as to enable said base, rack and cover to be carried together by said handles, said rack comprising a perforated fish supporting base and a pair of handles which extend outwardly beyond said base so as to enable said rack and cover to be carried together by said rack handles, said cover comprising a cover portion for overlying said base and said rack and defining a depending lip confronting said upstanding peripheral sidewall, and a handle which enables said cover to be removed from said base and rack, means on one of said rack base and said floor for elevating said rack base above said floor, notch means defined by at least one of said upstanding peripheral wall and said depending lip, and said rack handles being disposed in and extending outwardly through said notch means.

2. An elongated microwaveable fish poacher in accordance with claim 1, and wherein each of said upstanding peripheral wall and depending lip define notches in which said rack handles are disposed and through which said rack handles extend outwardly.

3. An elongated microwaveable fish poacher in accordance with claim 1, and wherein said fish poacher is greater in length than in width and said rack handles are at the lengthwise ends of the poacher, with one of said rack handles being covered in plan view by said cover portion and the other extending outwardly beyond one end of said cover portion to present the impression of a fish tail, and wherein said base handles extend outwardly from the upper reaches of the sidewall generally intermediate the length of the fish poacher and outwardly of the width of the cover portion to present the appearance of fish fins.

4. An elongated microwaveable fish poacher in accordance with claim 1, and wherein said elevating means comprise projections on the floor of said rack base and said perforated fish supporting base defines a series of elongated slots.

5. An elongated microwaveable fish poacher in accordance with claim 1, and wherein said notch means is defined by said upstanding peripheral wall at opposite ends of said base, said rack handles extend forwardly and rearwardly through said notches, and said rack handles, when said cover is in place are positioned to baffle air exchange between the interior and exterior of the fish poacher.

6. An elongated microwaveable fish poacher in accordance with claim 5, and wherein said fish poacher is greater in length than in width and said rack handles are at the lengthwise ends of the poacher, with one of said rack handles being covered in plan view by said cover portion and the other extending outwardly beyond one end of said cover portion to present the impression of a fish tail, and wherein said base handles extend outwardly from the upper reaches of the sidewall generally intermediate the length of the fish poacher and outwardly of the width of the cover portion to present the appearance of fish fins.

* * * * *

UNITED STATES PATENT AND TRADEMARK OFFICE
CERTIFICATE OF CORRECTION

PATENT NO. : 4,941,401

DATED : July 17, 1990

INVENTOR(S) : Norton Sarnoff and Carl R. Fletcher

It is certified that error appears in the above-identified patent and that said Letters Patent is hereby corrected as shown below:

In the Brief Description of The Drawings:

Column 2, line 17, delete the semicolon (;) and substitute a period (.); and

Column 2, delete lines 18 through 26.

Signed and Sealed this

Thirteenth Day of November, 1990

Attest:

HARRY F. MANBECK, JR.

Attesting Officer

Commissioner of Patents and Trademarks